US008840291B2

(12) United States Patent
Meyer-Wendt et al.

(10) Patent No.: US 8,840,291 B2
(45) Date of Patent: Sep. 23, 2014

(54) LED LAMP ASSEMBLY WITH HEAT SINK

(75) Inventors: Ralf Meyer-Wendt, Novi, MI (US); Xiaolu Chen, Saline, MI (US); John Dominick, Ann Arbor, MI (US); Stephen Kowalchik, Dexter, MI (US)

(73) Assignee: Federal-Mogul Ignition Company, Southfield, MI (US)

( * ) Notice: Subject to any disclaimer, the term of this patent is extended or adjusted under 35 U.S.C. 154(b) by 0 days.

(21) Appl. No.: 13/281,817

(22) Filed: Oct. 26, 2011

(65) Prior Publication Data

US 2013/0107561 A1 May 2, 2013

(51) Int. Cl.
*B60Q 1/00* (2006.01)
*F21V 29/00* (2006.01)
*F21S 8/10* (2006.01)

(52) U.S. Cl.
CPC ........... *F21S 48/1104* (2013.01); *F21S 48/115* (2013.01); *F21S 48/328* (2013.01); *F21S 48/15* (2013.01)
USPC ............................ 362/547; 362/545; 362/475

(58) Field of Classification Search
USPC .......................................... 362/475, 545, 547
See application file for complete search history.

(56) References Cited

U.S. PATENT DOCUMENTS

| | | | | |
|---|---|---|---|---|
| 7,535,727 | B2 * | 5/2009 | Tokida | 361/760 |
| 7,635,206 | B2 * | 12/2009 | Huang | 362/296.01 |
| 7,750,458 | B2 * | 7/2010 | Takeda et al. | 257/690 |
| 7,753,575 | B2 * | 7/2010 | Mochizuki et al. | 362/545 |
| 7,905,639 | B2 * | 3/2011 | Luo et al. | 362/487 |
| 8,132,947 | B2 * | 3/2012 | Shih | 362/547 |
| 8,277,099 | B2 * | 10/2012 | Hamashima | 362/528 |
| 8,408,764 | B2 * | 4/2013 | Chung et al. | 362/487 |
| 8,500,315 | B2 * | 8/2013 | Tokida et al. | 362/538 |
| 8,511,873 | B2 * | 8/2013 | Sugiyama | 362/539 |
| 8,591,053 | B2 * | 11/2013 | Thullier et al. | 362/97.2 |
| 2010/0321950 | A1 * | 12/2010 | Wong | 362/547 |

* cited by examiner

*Primary Examiner* — Peggy Neils
(74) *Attorney, Agent, or Firm* — Robert L. Stearns; Dickinson Wright, PLLC

(57) ABSTRACT

A vehicle lamp assembly includes a housing having an inner reflective surface with predetermined optics and an outer surface. The inner and outer surfaces extend between proximal and distal ends. A lens is attached to the distal end of the housing. The lens and the inner reflective surface bound an enclosed chamber of the assembly. The assembly further includes a heat sink subassembly. The subassembly includes a heat sink and an electronic module. The electronic module has PCB electronics and at least one LED coupled in electrical communication with one another. The subassembly is mounted to the proximal end of the housing externally from the enclosed chamber.

6 Claims, 3 Drawing Sheets

LED LAMP ASSEMBLY WITH HEAT SINK

BACKGROUND OF THE INVENTION

1. Technical Field

This invention relates generally to vehicle head lamp assemblies, and more particularly to vehicle head lamp assemblies having heat sinks.

2. Related Art

Light emitting diodes (LED) are becoming widely popular for use in vehicle lamp assemblies, such as head lamp assemblies. LED technology has increased in popularity due to their high levels of efficiency which result in power savings. However, for LED's to be effectively incorporated and used in lamp assemblies, the heat generated by their use needs to be removed during use, otherwise their light output suffers dramatically. Accordingly, it is known to couple a heat sink to an LED to remove the heat from the proximity of the LED in use. However, the heat sinks developed require additional components within the lamp assembly, which in turn increases cost of the lamp assembly. In addition, different platforms of lamps require the heat sinks to be configured differently from one another, thereby requiring inventory of multiple types of heat sinks. Accordingly, the cost of the lamp assemblies is further increased due to the need to inventory a wide variety of heat sink configurations. Further, the cost of lamp assembly is increased due to having additional components to assemble. As such, although heat sinks are known to enhance the effective light output and increase the useful life of LED lamp assemblies, the costs associated therewith come with a drawback.

SUMMARY OF THE INVENTION

A vehicle lamp assembly includes a housing having an inner reflective surface with predetermined optics and an outer surface. The inner and outer surfaces extend between proximal and distal ends. A lens is attached to the distal end of the housing. The lens and the inner reflective surface bound an enclosed chamber of the assembly. The assembly further includes a heat sink subassembly. The subassembly includes a heat sink and an electronic module. The electronic module has PCB electronics and at least one LED coupled in electrical communication with one another. The subassembly is mounted to the proximal end of the housing externally from the enclosed chamber.

In accordance with another aspect of the invention, the heat sink subassembly is externally accessible and removable from the housing as a single component. In accordance with another aspect of the invention, the LED is not viewable through the lens.

BRIEF DESCRIPTION OF THE DRAWINGS

These and other aspects, features and advantages of the invention will become readily apparent when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
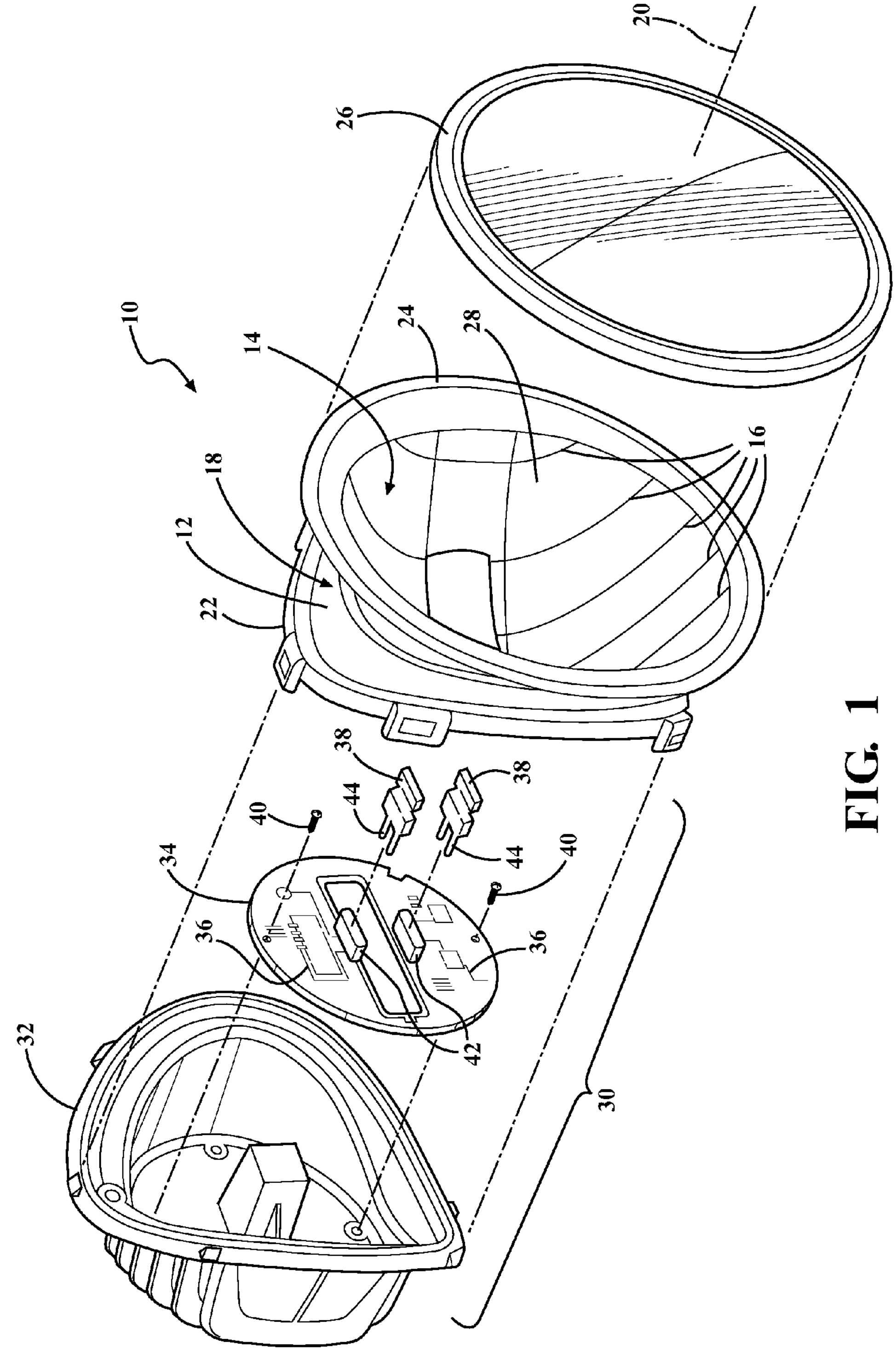
FIG. 1 is an exploded perspective view of a LED head lamp assembly constructed in accordance with one aspect of the invention.
Figure 2:
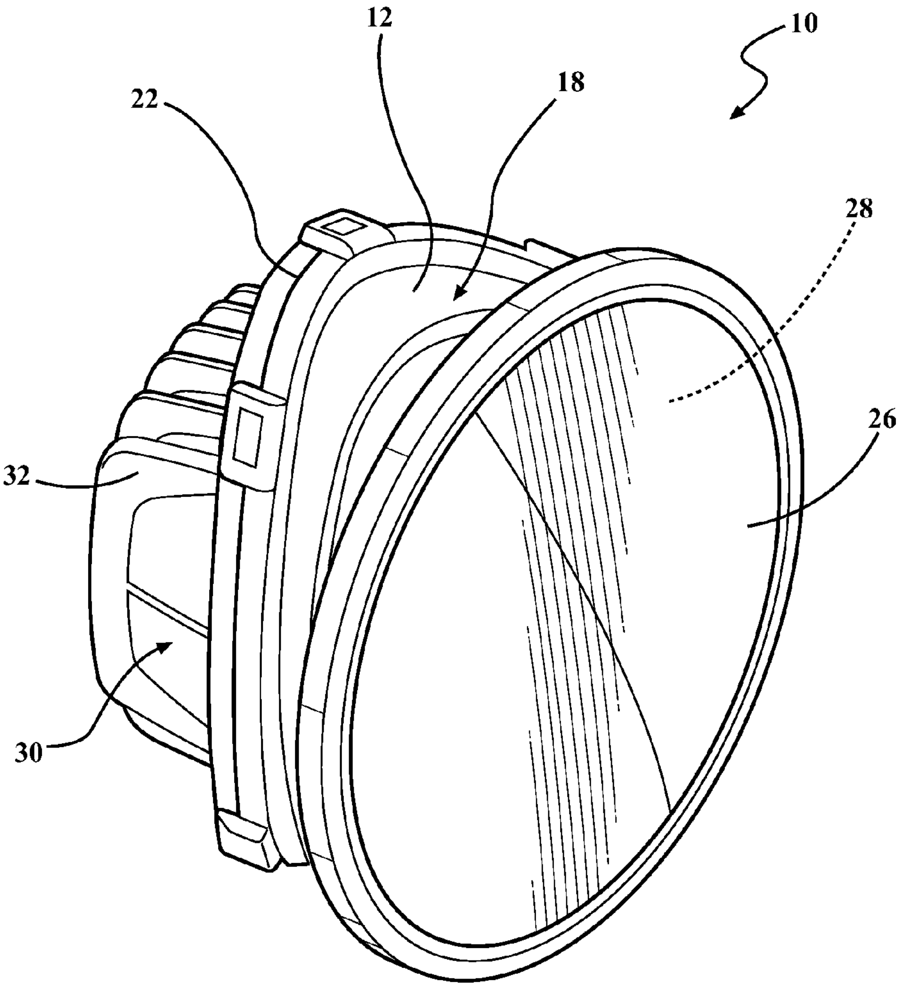
FIG. 2 is an assembled view of the headlamp assembly of FIG. 1.

Referring in more detail to the drawings, FIGS. 1 and 2 illustrate a lamp assembly, represented as a vehicle headlamp assembly, and more particularly as a motorcycle head lamp assembly 10 constructed in accordance with one aspect of the invention. The headlamp assembly 10 includes a housing 12 having a reflective inner surface 14 with predetermined optics 16 and an outer surface 18. The inner and outer surfaces 14, 18 extend along a central axis 20 between a proximal end 22 and a distal end 24. A lens 26 is attached to the distal end 24 of the housing 12. The lens 26 and the reflective inner surface bound an enclosed chamber 28 of the assembly 10. The assembly 10 further includes a heat sink subassembly 30. The subassembly 30 includes a heat sink 32 and an electronic module 34 having PCB electronics 36 and at least one, and shown as a pair of LED's 38 coupled in electrical communication with one another. The subassembly 30 is mounted to the proximal end 22 of the housing 12 externally from the enclosed chamber 28. Accordingly, the subassembly 30 is externally accessible and can be readily removed from the housing 12 as a single component without having to remove the lens 26. Further, the subassembly 30 is constructed as a universal subassembly, thereby being useful for a wide variety of lamp assemblies, regardless of the configuration of the optics 16 provided in the housing 12. Accordingly, the subassembly 30 simplifies manufacture by being universal for different lamp assemblies.

The electronic module 34 is fastened directly to the heat sink 32, such as by a pair of threaded fasteners 40, for example. The electronic module has a pair of receptacles 42 configured for receipt of terminals 44 of the LED's 38. The heat sink 32 is constructed from a material that has good thermal properties to act as a heat exchanger, such as a material selected from the group consisting of aluminum and magnesium, for example.

Figure 3:
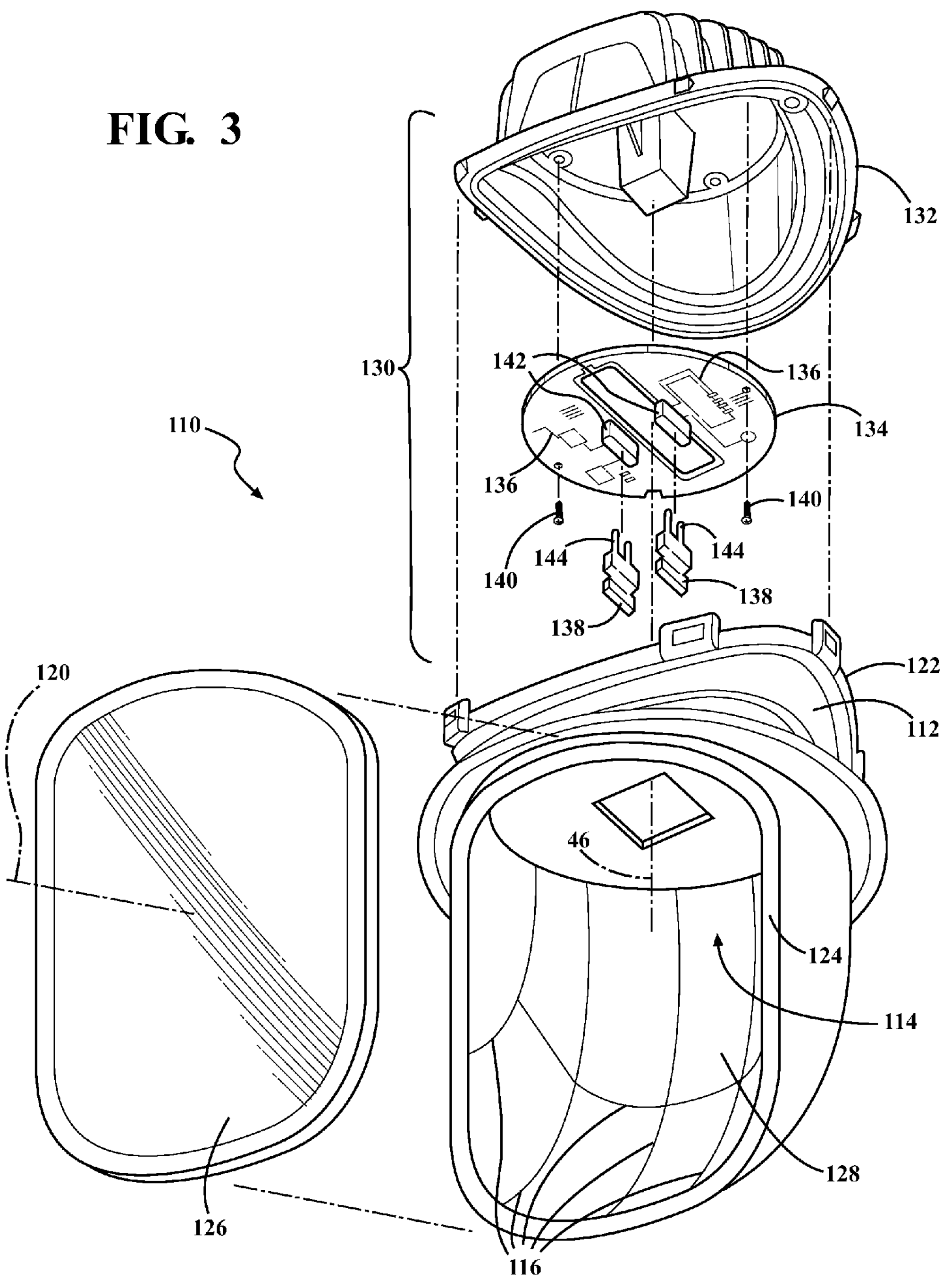
FIG. 3 is an exploded perspective view of a LED head lamp assembly constructed in accordance with another aspect of the invention.

A lamp assembly 110 constructed in accordance with another aspect of the invention is shown in FIG. 3, wherein the same reference numerals as used above, offset by a factor of 100, are used to identify like features.

The lamp assembly 110 includes similar components, including a housing 112, a lens 126 attached to a distal end 124 of the housing 112 and a heat sink subassembly 130 configured to be attached externally to a chamber 128 bounded by the housing 112 and lens 126 to a proximal end 122 of the housing 112. The housing 112 has a reflective inner surface 128 having optics 116 to direct light emitted from at least one, and shown as a pair of LED's 138 through the lens 126 along a central axis 120. The subassembly 130 includes a heat sink 132 and an electronic module 134 fastened thereto via fasteners 140, as discussed above, wherein the electronic module 134 includes PCB electronics 136 configured for electrical communication with the LEDs 138 via receptacles 142 configured for receipt of terminals 144 of the LED's 138. The notable difference between the assembly 10 and the assembly 110 is the orientation of the respective subassemblies 30, 130 relative to the respective housings 12, 112. As discussed, with the assembly 10, the housing 12 and the subassembly 30 are configured to extend along the common central axis 20. However, with the assembly 110, the housing 112 extends along the central axis 120, while the subassembly in oriented to extend along an axis 46 that is oblique to the central axis 120, and shown here as being perpendicular or substantially perpendicular to the central axis 120.

With the subassembly 130 being oriented in an oblique relation to the central axis 120, the LED's 138 are positioned out of view through the lens 126. Accordingly, if a person looks through the lens 126, the LED's 138 can't be seen. This is permitted due to the orientation of the reflective inner surface 114 and the configuration of the optics 116 within the housing 112 that reflect the light emitted by the LED's from the emitted direction extending along the axis 46 to a direction extending along the central axis 120 through the lens 126. Otherwise, the assemblies both allow the subassemblies 30, 130 to be removed from the respective housing 12, 112 as a single component, with both subassemblies 30, 130 being constructed as a universal component for use with a variety of platforms and configurations of housings.

Obviously, many modifications and variations of the present invention are possible in light of the above presently preferred embodiments. It is, therefore, to be understood that within the scope of the appended claims, the invention may be practiced other than specifically described above.

What is claimed is:

1. A vehicle lamp assembly, comprising:

a housing having an inner reflective surface with predetermined optics and an outer surface, said inner and outer surfaces extending between proximal and distal ends;

a lens attached to said distal end of said housing, said lens and said inner reflective surface bounding a first enclosed chamber of said assembly; and a heat sink subassembly including a heat sink and an electronic module, said electronic module including a printed circuit board with printed circuit board electronics mounted thereon and at least one LED coupled with said printed circuit board, said subassembly being mounted to said proximal end of said housing externally from said first enclosed chamber and said heat sink and said proximal end of said housing bounding a second enclosed chamber separate from said first enclosed chamber and wherein said electronic module is positioned in said second enclosed chamber.

2. The vehicle lamp assembly of claim 1 wherein said heat sink subassembly is externally accessible and removable from said housing as a single component.

3. The vehicle lamp assembly of claim 1 wherein said electronic module is fastened directly to said heat sink.

4. The vehicle lamp assembly of claim 1 wherein said heat sink is constructed from a material selected from the group consisting of aluminum and magnesium.

5. The vehicle lamp assembly of claim 1 wherein said at least one LED is not viewable through said lens.

6. The vehicle lamp assembly of claim 5 wherein said housing has a central axis and said at least one LED is oriented along an LED axis extending substantially perpendicular to said central axis.

* * * * *